Oct. 12, 1971     J. H. ANDRESEN, JR     3,611,810
DRIVE MEANS FOR POINTER OF AIRCRAFT INSTRUMENT
Filed Dec. 10, 1969
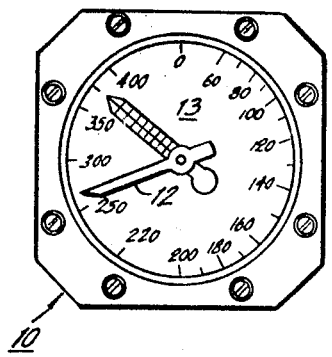
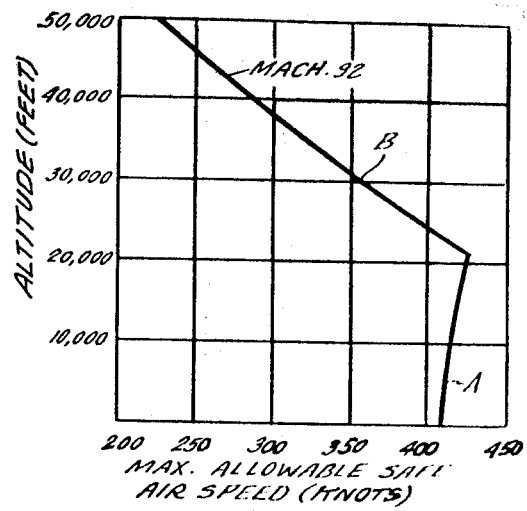
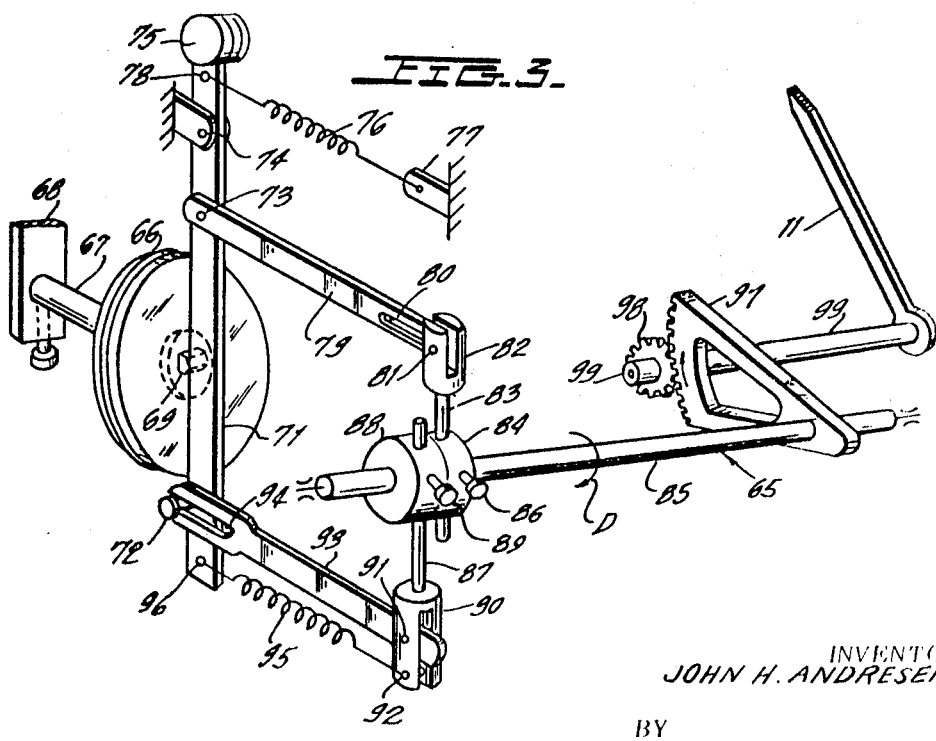
INVENTOR.
JOHN H. ANDRESEN, JR.
BY
Ostrolenk, Faber, Gerb & Soffen
ATTORNEYS

United States Patent Office 3,611,810
Patented Oct. 12, 1971

1

3,611,810
DRIVE MEANS FOR POINTER OF AIRCRAFT INSTRUMENT
John H. Andresen, Jr., Rocky Point, N.J., assignor to Intercontinental Dynamics Corporation, Englewood, N.J.
Filed Dec. 10, 1969, Ser. No. 883,978
Int. Cl. G01l 7/00
U.S. Cl. 73—397          4 Claims

ABSTRACT OF THE DISCLOSURE

An aircraft instrument is constructed so that the pointer thereof is driven successively by one or the other of two different link-lever systems in which the link and lever are joined by a slot pin connection to produce a pointer drive range and/or direction which is programmed to change in relation to a signal, changing steady rate, which mechanically drives the pointer.

---

This invention relates to aircraft instruments in general, and more particularly relates to utilization of pin slot connections joining the elements of link-lever mechanisms for pointer drive.

Pointer drive systems constructed in accordance with the instant invention find particular application in airspeed indicators and maximum allowable airspeed indicators. An instrument of this type is illustrated and described in the F. Hauptman U.S. Pat. No. 3,104,546 issued Sept. 24, 1963 on a Safe Flight Airspeed Mechanism.

As noted in the aforesaid U.S. Pat. No. 3,104,546, maximum allowable air speed versus altitude does not change at a constant rate. Instead, for a typical subsonic airplane, the maximum allowable airspeed increases gradually with altitude to a point where there is a relatively abrupt change, with maximum allowable airspeed decreasing gradually from this point onward. A mechanical pre-programmed computer must be used to move the pointer in the proper direction and with the proper rate of movement, in order to achieve the desired results.

In an airspeed indicator, it is desirable to have an expanded scale at the low speed range and to have a compressed scale at the high speed range. To produce movement of the pointer compatible with these desires, a dual link lever system is utilized.

It has been found that rubbing friction between the elements of the link lever systems is substantially reduced, with an accompanying improvement in accuracy, by utilizing a pin slot connection between the elements of the link lever system. Two independent adjustments are provided for each lever, with one adjustment being for lever length and the other adjustment being to set the angular position of lever with respect to the pointer drive shaft.

Accordingly, a primary object of the instant invention is to provide an improved construction of the drive system for the pointer of an aircraft instrument.

Another object is to provide drive systems of this type, wherein friction between relatively moving parts is minimized.

Still another object is to utilize pin slot connections between the link and lever elements in an indicating pointer drive system, wherein different link-lever systems are utilized to drive the pointer through different regions of the pointer range of travel.

These objects as well as other objects of this invention will become readily apparent after reading the following description of the accompaning drawings in which:

FIG. 1 is a front elevation of a combined airspeed and maximum allowable airspeed indicator constructed in accordance with teachings of the instant invention.

2

FIG. 2 is a graph on which maximum allowable airspeed for a particular aircraft is plotted against altitude.

FIG. 3 is a perspective in schematic form of the maximum allowable airspeed indicator portion of the instrument of FIG. 1.

As explained in detail in the aforesaid U.S. Pat. No. 3,104,546, the maximum allowable safe airspeed for a typical aircraft having only subsonic capabilities is not a continuous function of atmospheric static pressure, but may be simulated by a series of different mathematical functions. Thus, the simulation diagrammed in FIG. 2 consists of one function A extending from takeoff to approximately 22,000 feet, and another function extends from 22,000 feet to 50,000 feet. It is noted that maximum allowable safe airspeed increases gradually throughout the region of the function A, and decreases during the region of the second function B as altitude increases. It is noted that for some aircraft the function in the lower altitude region may be constant or have a negative slope.

Combined airspeed and maximum allowable airspeed indicator 10 of FIG. 1 includes maximum allowable pointer 11 and airspeed pointer 12, both rotatably mounted in front of scale or dial face 13. It is noted that dial face 13 is arranged so that the lower end of the scale is greatly expanded with respect to the higher end of the scale. Approximate means (not shown) known to the art may be used to drive airspeed pointer 12 in cooperation with dial face 13.

Computerized drive system 65 (FIG. 3) for maximum allowable airspeed pointer 11 includes sealed and evacuated capsule 66 secured to central post 67 which is adjustably mounted to fixed support 68. Drive point protrusion 69, centrally located on capsule 66, engages crank or lever 71 at a point intermediate pins 72, 74, which project laterally from lever 71. Pin 72 is below pin 74 to which lever 71 is pivotally mounted. Counterweight 75 is secured at the end of lever 71 above pin 74 and coiled tension spring 76, having one end secured to fixed element 77 and the other end secured to lever 71 at aperture 78 positioned above pivot 74, biases lever 71 in a counterclockwise direction with respect to FIG. 4. Where there is a reverse slope in the fail safe curve at low altitudes the left end of spring 76 is secured to lever 71 below pin 74. Pin 73 pivotally is positioned between pins 72, 74 and connects one end of link 79 to lever 71, while the other end of link 79 is provided with longitudinal slot 80 having pin 81 disposed therein. The slotted end of link 79 extends between the bifurcated sections of clevis 82 which supports pin 81. Clevis 82 is at the free end of lever 83 extending diametrically through hub 84, which secures together axially aligned portions of output shaft 85. The adjusted length of lever 83 is maintained by set screw 86 and the angular position of collar 84 on shaft 85 is maintained by another set screw (not shown).

Another collar 88 provides an adjustable support for lever 87. Set screw 89 maintains the adjust effective length of lever 87. The end of lever 87 remote from collar 88 is provided with clevis 90, which mounts pins 91 and 92. Pin 91 extends laterally through link 93 at one end thereof, while the other end of link 93 is provided with longitudinal slot 94, having pin 72 extending therein. Coiled tension spring 95 is secured at one end to pin 92 and is secured to lever 71 at hole 96 thereof positioned below pin 72.

Gear sector 97 is keyed to output shaft 85 and is in mesh with pinion 98 keyed to countershaft 99 to which maximum allowable airspeed pointer 11 is keyed. It is noted that shaft 99 is hollow and that the reduced diameter portion 47a at the forward end of airspeed pointer shaft 47 extends through shaft 99. It is also noted that spring 95 is weaker than spring 76, so that the latter is effective to bias intermediate lever 71 in a clockwise direction with respect to FIG. 4, and in so doing spring 76 biases pointer 11 toward a higher speed position.

In operation as altitude increases, the reduced pressure outside of capsule 66 permits the latter to expand, moving extension 69 thereof to the left with respect to FIG. 4 and pivoting intermediate lever 71 in a clockwise direction about pivot 74. In the position shown in FIG. 4, pin 81 is biased to the left end of slot 80, so that link 79 in cooperation with lever 83 determines the angular position of output shaft 85 as the latter moves clockwise (arrow D in FIG. 4). As projection 69 moves to the left, pin 72 moves to the left until a point is reached where pin 72 engages the left end of slot 94. From that point on, pin 72 serves to drive link 93 to the left with respect to FIG. 4, and link 93 in cooperation with lever 87 pivots output shaft 85 opposite to the direction indicated by arrow D.

It should now be obvious to those skilled in the art that link-lever combination 71, 83 drives pointer 11 through the range indicated by curve portion A in FIG. 2, while link lever combination 93, 87 drives pointer 11 through curve portion B of FIG. 2.

The pin-slot connecting construction utilized between elements of each link-lever group improves accuracy by eliminating sliding friction type connections of the prior art construction, in that friction forces which vary in an erratic manner are eliminated.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. An aircraft instrument including an indicator having a displaceable member, a pressure responsive transducer, and drive means connecting said transducer to said member to move the latter responsive to pressure variations detected by said transducer; said drive means including a first and a second function drive providing respective first and second driving means operative to move said member during respective first and second ranges of pressure variations; each of said function drives including a link, a lever and a pin-slot connection, with a first end of said link being connected to a second end of said lever; said pin-slot connection of said first function drive providing a first lost motion connection between said transducer and said lever of said first function drive during said second range of pressure variation; said pin-slot connection of said second function drive providing a second lost motion connection between said transducer and said lever of said second function drive during said first range of pressure variations; said first and second drives providing different drive ratios between said transducer and said member; said first and second drives moving said member in opposite directions; said drive means including an intermediate lever interposed between said transducer and said links; a pivot support for said intermediate lever; said links of said first and second function drives being connected to said intermediate lever at respective first and second pivot points spaced along the length thereof.

2. An aircraft instrument as set forth in claim 1, in which independent adjustments are provided to set the effective lengths of each of said levers and additional independent adjustments are provided to set relative positions between said levers.

3. An aircraft instrument as set forth in claim 1, in which the pin-slot connection of the first drive is at said first pivot point and the pin-slot connection of the second drive connects the link and the lever thereof, said first pivot point being closer to said pivot support than said second pivot point, first biasing means urging said intermediate lever toward said transducer and second biasing means urging said intermediate lever away from said transducer, said first biasing means connected to exert a greater influence on said intermediate lever than the influence exerted thereon by said second biasing means.

4. An aircraft instrument as set forth in claim 3, in which both of said pivot points are on the same side of said pivot support and said transducer is operatively connected to said intermediate lever at another point disposed between said first and said second pivot points.

References Cited

UNITED STATES PATENTS 3,104,546  10/1970  Hauptman _____ 73—397 X

FOREIGN PATENTS 652,259  4/1951  Great Britain _____ 73—397

DONALD O. WOODIEL, Primary Examiner

U.S. Cl. X.R.

73—384